US012612167B2

(12) United States Patent
Selvaraj et al.

(10) Patent No.: US 12,612,167 B2
(45) Date of Patent: Apr. 28, 2026

(54) LOW-POWER ICE PROTECTION SYSTEM HAVING ZONED THERMAL ELEMENTS INTEGRATED WITH ZONED VIBRATION ELEMENTS

(71) Applicant: Goodrich Corporation, Charlotte, NC (US)

(72) Inventors: Sugumaran Selvaraj, Karnataka (IN); Shyam Kumar Dattatri, Karnataka (IN); Manjunath Hiremath, Karnataka (IN); Rhushikesh Patil, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 3 days.

(21) Appl. No.: 18/788,756

(22) Filed: Jul. 30, 2024

(65) Prior Publication Data

US 2025/0042556 A1     Feb. 6, 2025

(30) Foreign Application Priority Data

Aug. 1, 2023    (IN) .............................. 202311051638
Nov. 23, 2023    (IN) .............................. 202311079579

(51) Int. Cl.
    *B64D 15/12*     (2006.01)
    *B64D 15/16*     (2006.01)
    *B64D 15/22*     (2006.01)
(52) U.S. Cl.
    CPC ............. *B64D 15/12* (2013.01); *B64D 15/16* (2013.01); *B64D 15/22* (2013.01)
(58) Field of Classification Search
    CPC ......... B64D 15/12; B64D 15/16; B64D 15/22
    See application file for complete search history.

(56) References Cited

U.S. PATENT DOCUMENTS 7,708,227 B2 * 5/2010 Al-Khalil ............... B64D 15/12
                                     244/134 A
10,124,902 B2   11/2018 Hull et al.
             (Continued)

FOREIGN PATENT DOCUMENTS

CN      105667807 A    6/2016
CN      208733012 U    4/2019
             (Continued)

OTHER PUBLICATIONS

European Search Report for Application No. 24191785.5, mailed Dec. 16, 2024, 10 pages.

*Primary Examiner* — Timothy D Collins
*Assistant Examiner* — Justin Michael Heston
(74) *Attorney, Agent, or Firm* — CANTOR COLBURN LLP

(57) ABSTRACT

A target material removal (TMR) element is provided and includes a body region; thermal elements within the body region; and vibration elements within the body region. The TMR element is controlled to perform TMR operations that include one or more of the thermal elements generating heat that is transmitted through the body region to a target material in a manner that defines one or more zones of the target material. The TMR operations further include, subsequent to the one or more of the thermal elements beginning generating the heat that is transmitted through the body region to the target material, the one or more of the vibration elements generating vibrations that are transmitted through the body region to the one or more zones of the target material.

20 Claims, 10 Drawing Sheets

(56)     References Cited

U.S. PATENT DOCUMENTS

| 10,131,449 | B2 | 11/2018 | Strobl et al. |
| 10,442,540 | B2 | 10/2019 | Strobl et al. |
| 11,371,433 | B2 | 6/2022 | Saripella et al. |
| 2020/0032708 | A1 | 1/2020 | Roberge |

FOREIGN PATENT DOCUMENTS

| CN | 208739441 | U | 4/2019 |
| CN | 113086211 | A | 7/2021 |
| CN | 109436338 | B | 5/2022 |
| CN | 113086156 | B | 5/2022 |
| CN | 112644714 | B | 9/2022 |
| CN | 115042979 | A | 9/2022 |
| CN | 107127190 | B | 4/2023 |
| KR | 102042975 | B1 | 11/2019 |
| WO | 2022241544 | A1 | 11/2022 |

* cited by examiner

200

START 202

Access initial or next ice thickness (IT) readings from an initial or next Zone 204

IT > Max? 206

Activate Thermal Element (TE) associated with the initial or next Zone 208

TE timed out? 210

Activate Vibration Element (VE) associated with the initial or next Zone 212

VE timed out? 214

De-activate VE associated with the initial or next Zone 216

Last Zone? 218

Last Zone Cycle? 220

END 222

Exploded view

Breeze-side layer 520A

Thermal element 130B

Matrix 112B

Piezo/PCB array 740

Bond-side layer 710

Surface 510

TMR element 110B

LOW-POWER ICE PROTECTION SYSTEM HAVING ZONED THERMAL ELEMENTS INTEGRATED WITH ZONED VIBRATION ELEMENTS

CROSS-REFERENCE TO RELATED APPLICATIONS

This application claims the benefit of Indian Application No. 202311051638 filed Aug. 1, 2023, and Indian Application No. 202311079579 filed Nov. 23, 2023, the disclosures of which are incorporated herein by reference in their entirety.

BACKGROUND

The present disclosure relates to ice protection systems (IPSs) and, more particularly, to a novel low-power IPS having thermal elements and vibrations elements that are zoned and separately controllable.

Aircraft and engine ice protection systems are generally designed to prevent ice from forming or remove the ice after it has formed. The latter type of system is referred to as a de-icing system, and the former is referred to as an anti-icing system. De-icing and anti-icing systems can be referred to generally as ice protection systems (IPS). Various modes of IPS include pneumatic, electro-thermal and electro-mechanical expulsion systems. A common attribute of known IPS is that their components and ice protection (e.g., de-icing/anti-icing) operations consume a relatively large amount of power.

So-called electrified aircraft propulsion (EAP) technologies are being developed to enable a new generation of electric-powered aircraft. EAP technologies are designed to make flight more sustainable, including lighter and more efficient motors, electronics, and materials that can help reduce emission levels and improve fuel efficiency. The efficient use and allocation of battery-generated electricity is a design goal in any aircraft design, and will be a particularly important design goal in electric-powered aircraft that leverage EAP technologies.

BRIEF DESCRIPTION

Disclosed is a target material removal (TMR) system that includes a body region; thermal elements within the body region; and vibration elements within the body region. The TMR system is controlled to perform TMR operations that include one or more of the thermal elements generating heat that is transmitted through the body region to a target material in a manner that defines one or more zones of the target material. The TMR operations further include, subsequent to the one or more thermal elements beginning generating the heat that is transmitted through the body region to the target material, one or more of the vibration elements generating vibrations that are transmitted through the body region to the one or more zones of the target material.

In addition to one or more of the features described herein, the thermal elements include a first thermal element; the one or more zones of the target material include a first zone region of the target material; and the first thermal element transmits at least a first portion of the heat through the body region in a manner that defines a perimeter of the first zone region.

In addition to one or more of the features described herein, the vibration elements include a first vibration element that transmits at least a first portion of the vibrations through the body region to some or all of the first zone region.

In addition to one or more of the features described herein, the thermal elements include a second thermal element; the one or more zones of the target material include a second zone region of the target material; the second thermal element transmits a second portion of the heat through the body region in a manner that defines a perimeter of the second zone region; and the vibration elements include a second vibration element that transmits a second portion of the vibrations through the body region to some or all of the second zone region.

In addition to one or more of the features described herein, the target material includes a target frozen material; and the at least first portion of the heat is applied to the frozen material in the first zone region.

In addition to one or more of the features described herein, the at least first portion of the vibrations is sufficient to impart shearing stress to the first zone region.

In addition to one or more of the features described herein, the target material includes a target frozen material; the at least first portion of the heat is applied to the target frozen material in the first zone region; the at least first portion of the vibrations is sufficient to impart shearing stress to the frozen material in the first zone region; the second portion of the heat is applied to the target frozen material in the second zone region; and the second portion of the vibrations is sufficient to impart shearing stress to the frozen material in the second zone region.

Also disclosed is an IPS that includes a body region; thermal elements within the body region; vibration elements within the body region; and a sensor network within the body region. The IPS is controlled to perform ice protection operations that include the sensor network detecting a formation of a target frozen material to a predetermined first thickness; based at least in part on the sensor network detecting the formation of the target frozen material to the predetermined first thickness, one or more of the thermal elements generating heat that is transmitted through the body region to the target frozen material in a manner that defines one or more zones of the target frozen material; and subsequent to the one or more of the thermal elements beginning generating the heat that is transmitted through the body region to the target frozen material, one or more vibration elements generating vibrations that are transmitted through the body region to the one or more zones of the target frozen material.

In addition to one or more of the features described herein, the thermal elements include a first thermal element; the one or more zones of the target frozen material include a first zone region of the target frozen material; and the first thermal element transmits at least a first portion of the heat through the body region in a manner that defines a perimeter of the first zone region.

In addition to one or more of the features described herein, the vibration elements include a first vibration element that transmits at least a first portion of the vibrations through the body region to some or all of the first zone region; and the ice protection operations further include terminating operation of the first vibration element responsive to a determination that a first termination criterion has been satisfied.

In addition to one or more of the features described herein, the determination that the first termination criterion has been satisfied includes a determination that an activation duration of the first vibration element has ended.

In addition to one or more of the features described herein, the thermal elements include a second thermal element; the one or more zones of the target frozen material include a second zone region of the target frozen material; the second thermal element transmits a second portion of the heat through the body region in a manner that defines a perimeter of the second zone region; the one or more vibration elements include a second vibration element; the second vibration element transmits a second portion of the vibrations through the body region to some or all of the second zone region; and the ice protection operations further include terminating operation of the second vibration element responsive to a determination that a second termination criterion has been satisfied.

In addition to one or more of the features described herein, the determination that the second termination criterion has been satisfied includes a determination that an activation duration of the second vibration element has ended.

In addition to one or more of the features described herein, the at least first portion of the vibrations is sufficient to impart shearing stress to the first zone region; and the second portion of the vibrations is sufficient to impart shearing stress to the second zone region.

Also disclosed is a controller operable to perform controller operations that control a target material removal (TMR) element. The controller operations include sending control instruction to the TMR element to perform TMR operations. The TMR element includes a body region that includes thermal elements and vibration elements. The TMR operations include one or more of the thermal elements generating heat that is transmitted through the body region to a target material in a manner that defines one or more zones of the target material; and subsequent to the one or more of the thermal elements beginning generating the heat that is transmitted through the body region to the target material, the one or more of the vibration elements generating vibrations that are transmitted through the body region to the one or more zones of the target material.

In addition to one or more of the features described herein, the thermal elements include a first thermal element; the one or more zones of the target material include a first zone region of the target material; the first thermal element transmits at least a first portion of the heat through the body region in a manner that defines a perimeter of the one or more first zone region; the vibration elements include a first vibration element; and the first vibration element transmits at least a first portion of the vibrations through the body region to the first zone region.

In addition to one or more of the features described herein, the thermal elements include a second thermal element; the one or more zones of the target material include a second zone region of the target material; the second thermal element transmits a second portion of the heat through the body region in a manner that defines a perimeter of the second zone region; the vibration elements include a second vibration element; and the second vibration element transmits a second portion of the vibrations through the body region to some or all of the second zone region.

In addition to one or more of the features described herein, the target material includes a target frozen material; and the at least first portion of the heat is applied to the first zone region.

In addition to one or more of the features described herein, the at least some of the first portion of the vibrations is sufficient to impart shearing stress to the first zone region.

In addition to one or more of the features described herein, the target material includes a target frozen material; the at least first portion of the heat is applied to the first zone region; the at least first portion of the vibrations is sufficient to impart shearing stress to the first zone region; the second portion of the heat is applied to the second zone region; and the second portion of the vibrations is sufficient to impart shearing stress to the second zone region.

In any one or more of the previously described features and embodiments of the disclosure, the body region can include a matrix region.

In any one or more of the previously described features and embodiments of the disclosure, the matrix region comprises a network of zoned thermal elements integrated with a network of zoned vibration elements.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
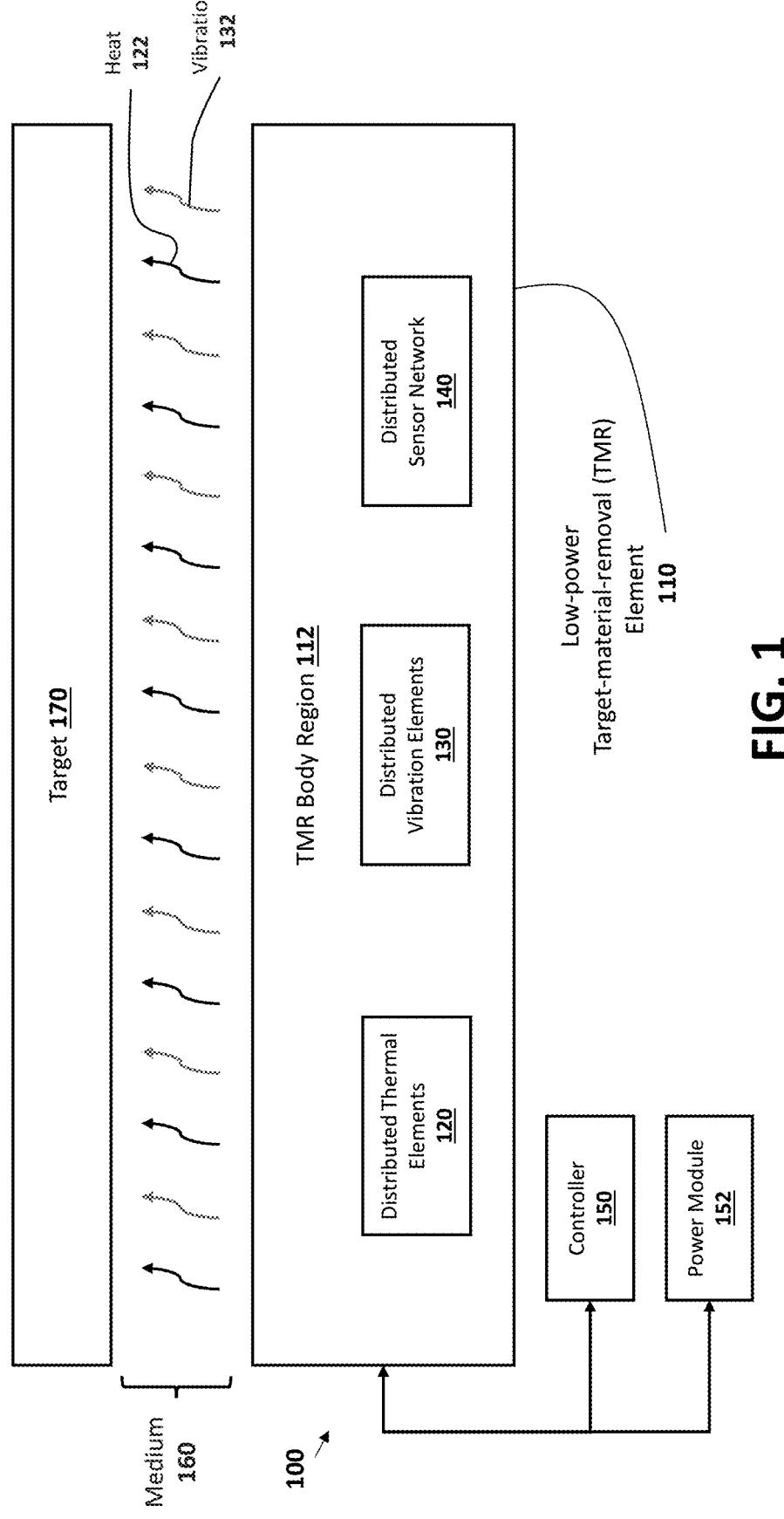
FIG. 1 is a simplified block diagram illustrating a system in accordance with embodiments of the disclosure.

A detailed description of one or more embodiments of the disclosed apparatus and method are presented herein by way of exemplification and not limitation with reference to the Figures.

Some exemplary embodiments of the disclosure provide a novel IPS that includes a low-power target-material-removal (TMR) system operable to remove a target material from a surface of a structure, including but not limited to an aircraft. In embodiments of the disclosure, the target material is a totally or partially frozen material that is responsive to heat-induced thawing and vibration-induced dislodging. The TMR system includes a processor-controlled TMR element formed from a body region operable to house a network of zoned thermal elements and a network of zoned vibration elements. The body region can also house a network of sensors. The TMR element can be attached to an inner surface or an outer surface of the structure from which the target material is to be removed. When the TMR element is attached to an inner surface of the structure, zoned heat and vibrations generated by the TMR element are configured and arranged to take into account that they need to pass through the TMR body region and the structure. When the TMR element is attached to an outer surface of the structure, the target material forms on the TMR element, and the zoned heat and vibrations generated by the TMR element are configured and arranged to take into account that they need to pass substantially directly through the TMR body groin to the structure. When the TMR element is attached to an outer surface of the structure, a protective erosion shield can be added to TMR body region such that the target material forms on the protective erosion shield of the TMR element, and the zoned heat and vibrations generated by the TMR element pass substantially directly to the structure through the TMR body region and the TMR erosion shield. In some embodiments of the disclosure, the TMR erosion shield can also be used when the TMR element is attached to an inner surface of the structure. In any of the above-described situations, the zoned heat and vibrations generated by the TMR element are configured and arranged such that the heat and vibrations that arrive at the structure are sufficient to perform the above-described heat-induced thawing and vibration-induced dislodging.

In some embodiments of the disclosure, the zoned thermal elements and the zoned vibration elements can be independently controlled by a separate controller to perform TMR operations. In embodiments of the disclosure, the zoned thermal elements are configured such that each zoned thermal element generates heat that is transmitted through the TMR element to the target material in a pattern that defines individual heating zones of the target material. In some embodiments of the disclosure, each thermal element does not provide heat throughout its associated zone but instead limits it application of heat (and its corresponding use of electric power) to some or all of a perimeter of its associated zone. In embodiments of the disclosure, the TMR operations include using the TMR sensor network to determine that a thickness of the target material has reached a value that initiates activation of the TMR system. Responsive to detecting that the thickness of the target material has reached the value that initiates activation of the TMR system, the TMR controller activates the thermal elements to provide heat to their associated zones. The TMR operations further include, subsequent to the thermal elements beginning to generate the heat that is transmitted through the body region to the target material, activating the vibration elements to generate vibrations that are transmitted through the body region to the zones of the target material. In this manner, the heat from the thermal elements loosen the target material to a certain level, and then the vibration elements complete removal of the target material from the structure by applying to the loosened target material vibrations that impart shearing stress to the loosened target material. The sensor network can be used to detect that the vibrations have removed or substantially removed the target material from a given zone.

Some exemplary embodiments of the disclosure provide a novel IPS that includes a low-power target-material-removal (TMR) system operable to remove a target material from a surface of a structure, including but not limited to an aircraft. In embodiments of the disclosure, the target material is a totally or partially frozen material that is responsive to heat-induced thawing and vibration-induced dislodging. The TMR system includes a processor-controlled integrated TMR element formed from a matrix region sandwiched between a breeze-side layer and bond-side layer. The matrix region is operable to house a network of zoned thermal elements integrated with a network of zoned vibration elements. The matrix region can also house a network of sensors. In some embodiments of the disclosure, the zoned thermal elements are integrated with the zoned vibration elements according to an offset pattern operable to produce optimum shear stress at an interface with the target material to effectively and efficiently shed accreted target material. The bond-side layer is operable to assist with mounting the integrated TMR element to the structure's surface with application of, for example, a suitable adhesive. The matrix can further include an array of the vibration element actuators electrically connected to a flexible control board, where the zoned thermal elements laced across locations surrounding the TMR vibration element actuators strategically to assist with fragmentation, shearing and shedding of the target material. The breeze-side layer is operable to shield the underlaying layers of the integrated TMR element from erosion and environmental impact.

The TMR element can be attached to an inner surface or an outer surface of the structure from which the target material is to be removed. When the TMR element is attached to an inner surface of the structure, zoned heat and vibrations generated by the TMR element are configured and arranged to take into account that they need to pass through the TMR matrix region and the structure. When the TMR element is attached to an outer surface of the structure, the target material forms on the TMR element, and the zoned heat and vibrations generated by the TMR element are configured and arranged to take into account that they need to pass substantially directly through the TMR matrix before going into the structure. When the TMR element is attached to an outer surface of the structure, the breeze-side layer is positioned such that the target material forms on the breeze-side layer of the integrated TMR element, and the zoned heat and vibrations generated by the TMR element pass substantially directly to the structure through the TMR matrix region and the TMR breeze-side layer. In some embodiments of the disclosure, the TMR breeze-side layer can also be used when the TMR element is attached to an inner surface of the structure. In any of the above-described situations, the zoned heat and vibrations generated by the TMR element are configured and arranged such that the heat and vibrations that arrive at the structure are sufficient to perform the above-described heat-induced thawing and vibration-induced dislodging.

In embodiments of the disclosure, the zoned thermal elements integrated with the zoned vibration elements can be independently controlled by a separate controller to perform TMR operations. In embodiments of the disclosure, the zoned thermal elements are configured such that each zoned thermal element generates heat that is transmitted through the TMR element to the target material in a pattern that defines individual heating zones of the target material. In some embodiments of the disclosure, each thermal element does not provide heat throughout its associated zone but instead limits it application of heat (and its corresponding use of electric power) to some or all of a perimeter of its associated zone. In embodiments of the disclosure, the TMR operations include using the TMR sensor network to determine that a thickness of the target material has reached a value that initiates activation of the TMR system. Responsive to detecting that the thickness of the target material has reached the value that initiates activation of the TMR system, the TMR controller activates the thermal elements to provide heat to their associated zones. The TMR operations further include, subsequent to the thermal elements beginning to generate the heat that is transmitted through the matrix region to the target material, activating the vibration elements to generate vibrations that are transmitted through the matrix region to the zones of the target material. In this manner, the heat from the thermal elements loosen the target material to a certain level, and then the vibration elements complete removal of the target material from the structure by applying to the loosened target material vibrations that impart shearing stress to the loosened target material. The sensor network can be used to detect that the vibrations have removed or substantially removed the target material from a given zone.

In embodiments of the disclosure, each thermal element and vibration element can be individually or separately controlled such that if target material removal is completed in a first zone before target material removal is completed in a second zone, the operations of the vibration element associated with the first zone can be deactivated while the vibration element associated with the second zone is continued to completion, thereby conserving electric power that would be used by the vibration element associated with the first zone.

In some embodiments of the disclosure, the target material includes a frozen target material. In some embodiments of the disclosure, the target frozen material includes ice. In some embodiments of the disclosure, the structure is an aircraft, and the TMR element(s) can be applied to any location of the aircraft from which the target material needs to be removed, including, for example, any location on or inside the aircraft's wing. In some embodiments of the disclosure, the structure is a substantially all-electric aircraft. In some embodiments of the disclosure, the thermal element can be a conductive material (e.g., tungsten) operable to implement Joule heating. Joule heating is the physical effect by which the passage of current through an electrical conductor produces thermal energy. In some embodiments of the disclosure, the vibration element can be implemented as a ceramic piezo-electric material operable to generate mechanical movement such as vibrations in response to electric power.

Accordingly, embodiments of the disclosure provide a low-power IPS operable to reduce the overall dynamic and static power consumption of the IPS using a collection of novel design techniques and methodologies for the purpose of optimizing battery lifetime of the IPS's host (e.g., an aircraft). The novel design techniques include zoned and separately controllable heat/vibration regions; relatively simple and low-power consumption elements (tungsten wire, joule heating, piezo-electric material, etc.); limiting the regions where heat is applied (e.g., zone perimeter); and controlling the duration of IPS operations such that heat/vibration generation is limited to what is needed for each individual zone or for groups of zones. In some embodiments of the disclosure, the novel integrated TMR element can be configured as modular TMR elements where defective or faulty integrated TMR elements can be easily removed and replaced. The single integrated TMR matrix layer, which houses TMR thermal elements, TMR vibration elements, and sensors, can be attached with adhesives, thereby avoiding the need for countersunk screw attachment mechanisms.

Turning now to a more detailed description of aspects of the disclosure, FIG. 1 depicts a simplified block diagram illustrating a target-material-removal (TMR) system 100 in accordance with embodiments of the disclosure. The TMR system 100 includes one or more low-power TMR elements 110 electrically coupled to a controller 150 and a power module 152. The TMR element 110 includes a TMR body region 112 that houses distributed thermal elements 120, distributed vibration elements 130, and a distributed sensor network 140, configured and arranged as shown. The distributed thermal elements 120 are operable to generate heat 122 that passes through the TMR body region 112 and an optional intermediary medium 160 to a target 170 that includes a target material. Similarly, the distributed vibration elements 130 are operable to generate vibrations 132 that pass through the TMR body region 112 and the optional intermediary medium 160 to the target 170 that includes the target material. In some embodiments of the disclosure, the intermediary medium 160 is a wall or other portion of an aircraft. In some embodiments of the disclosure, the intermediary medium 160 can be an erosion shield (e.g., the erosion shield 520 shown in FIG. 5) between the TMR element 110 and the target 170. In some embodiments of the disclosure, the intermediary medium 160 can be eliminated and the target 170 can be formed on the TMR element 110.

Figure 2:
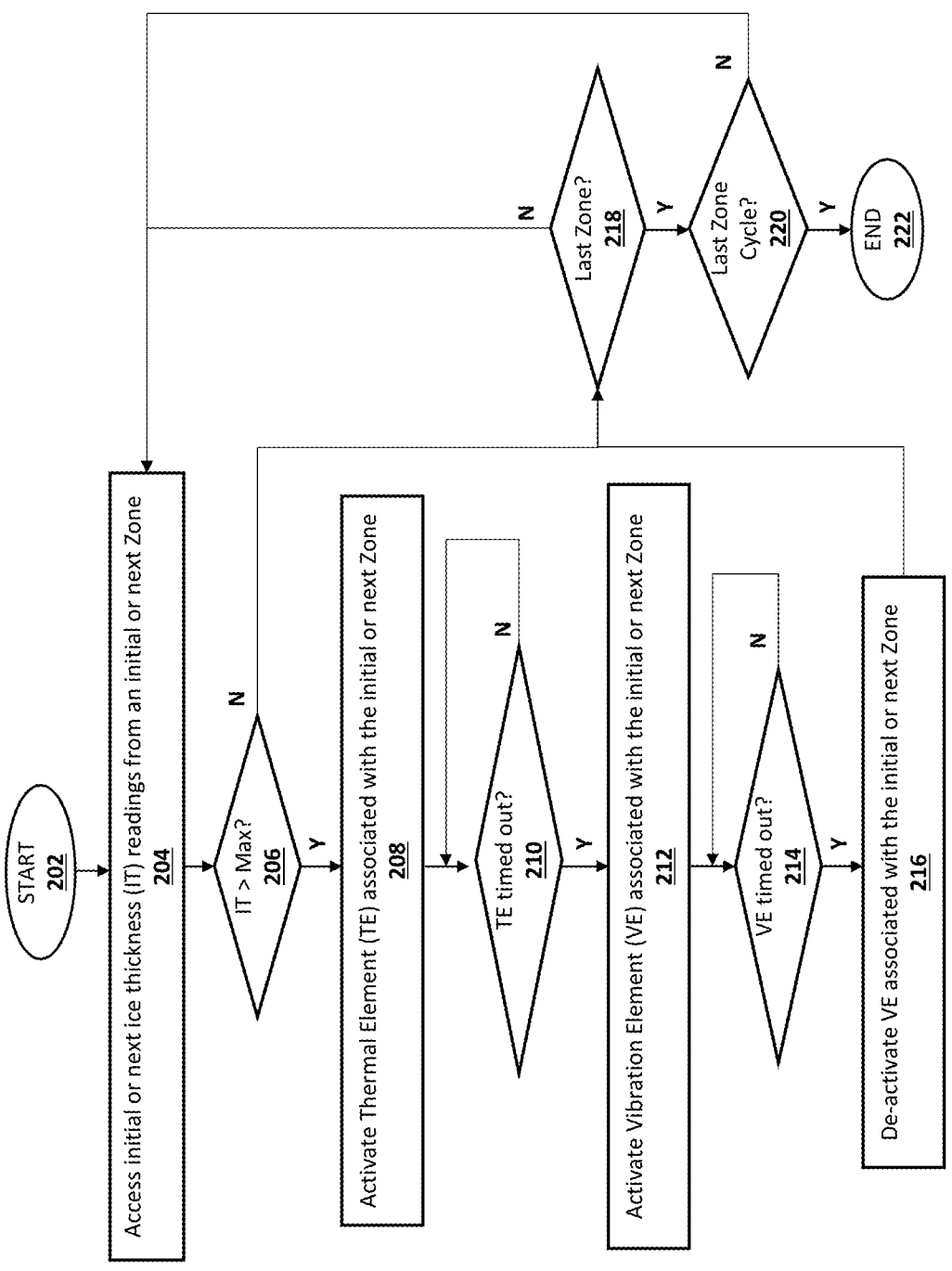
FIG. 2 is a flow diagram illustrating a methodology in accordance with embodiments of the disclosure.
Figure 3:
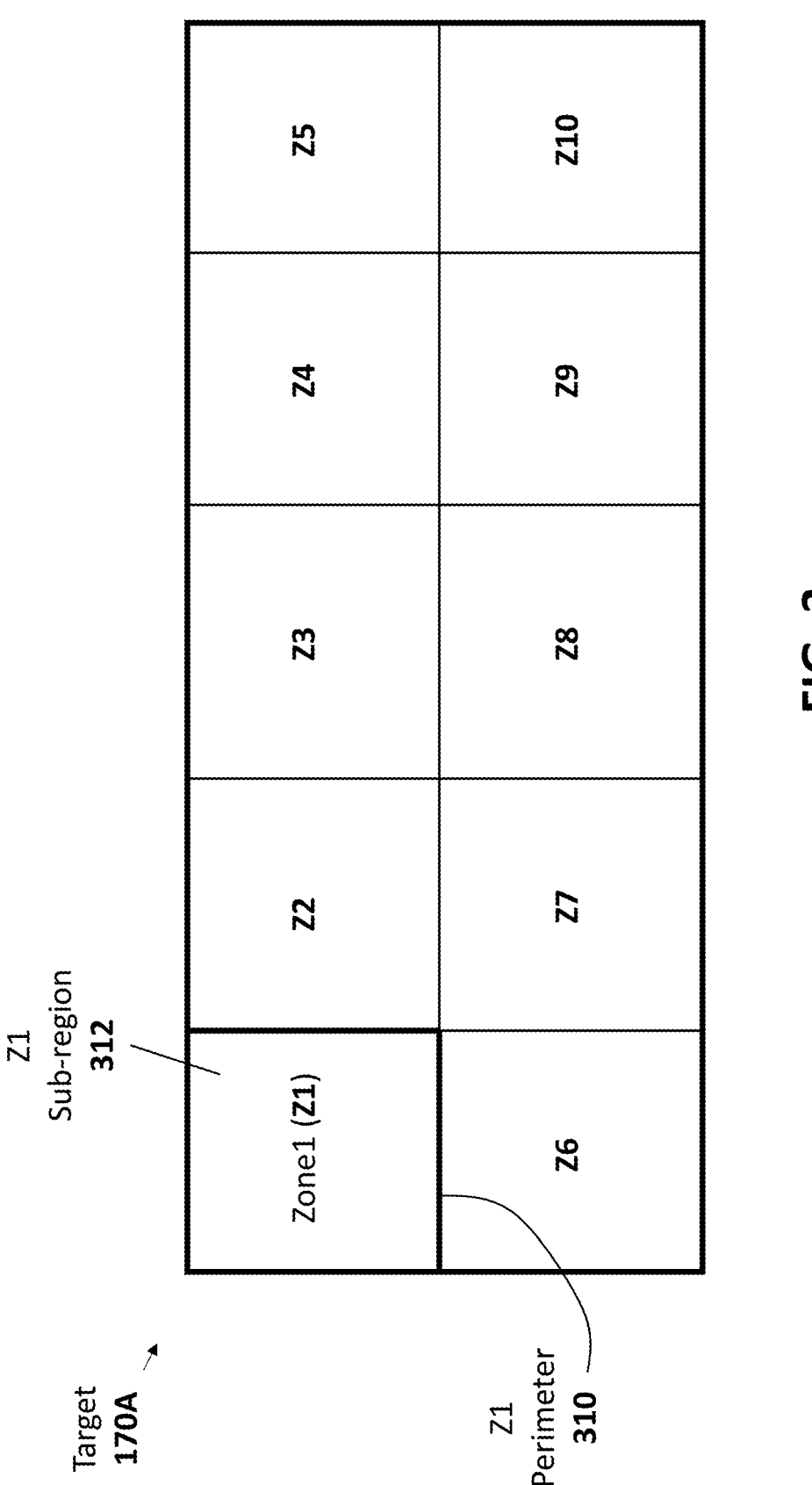
FIG. 3 is a simplified block diagram illustrating zone regions of a target using the system shown in FIG. 1 in accordance with embodiments of the disclosure.
Figure 4:
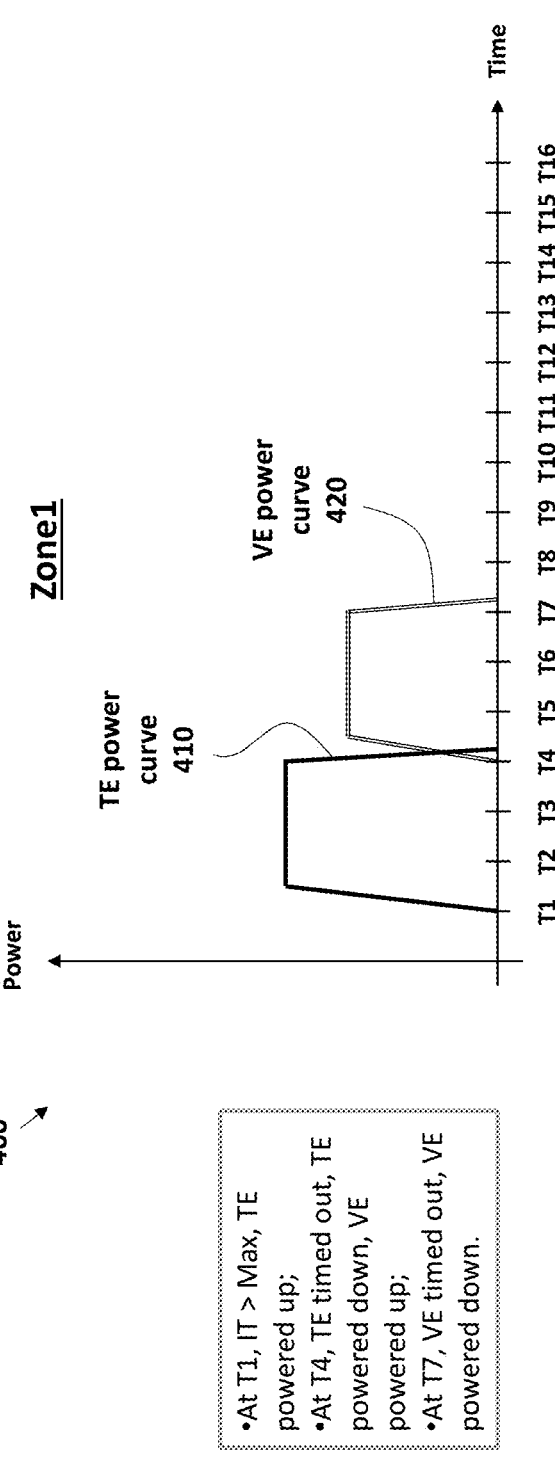
FIG. 4 is a plot illustrating power curves applied to the system shown in FIG. 1 in accordance with embodiments of the disclosure.

The TMR system 100 can operate in accordance with a methodology 200 illustrated by the flow diagram shown in FIG. 2. Additionally, FIG. 3 is a simplified block diagram illustrating zone regions (Z1-Z10) of the target 170 using the TMR system 100. Further, FIG. 4 depicts a plot 400 illustrating the power curves applied to the thermal elements 120 and the vibration elements 130 by the TMR system 100 during performance of the methodology 200. The operation of the TMR system 200 will now be described with primary reference to the methodology 200 shown in FIG. 2 with references where appropriate to corresponding elements, processes, and illustrations in FIGS. 1, 3, and 4. Although it is assumed in methodology 200 that the target 170 is ice, the methodology 200 applies to any implementation of the target 170.

The methodology 200 begins at block 202 then moves to block 204 where the controller 150 accesses an initial or next ice thickness (IT) reading from the sensor network 140 for an initial or next zone of the target 170. In some embodiments of the disclosure, the IT readings can be gathered and processed by the methodology 200 for batches or groups of zones. Where block 204 gathers zones and IT reading in batches, the operations at blocks 206-220 are performed on each zone substantially in parallel. In some embodiments of the disclosure, where block 204 gathers zones and IT reading in batches, the operations at blocks 206-220 are performed on each zone substantially in series. In the methodology 200, the target 170 is implemented as ice 170. In some embodiments of the disclosure, each of the distributed thermal elements 120 and each of the distributed vibration elements 130 are organized into thermal/vibration pairs such that each thermal/vibration pair is assigned to and defines a zone on the ice 170. An example of the ice 170 organized into zones by the thermal/vibration pairs is illustrated by the target 170A shown in FIG. 3. In the example shown in FIG. 3, the target 170A includes ten (10) zones labeled as Z1-Z10. The thermal element 120 assigned to Z1 is configured in a shape that defines some or all of the Z1 perimeter 310, and the vibration element 130 assigned to Z1 is configured in a shape that occupies some or all of a Z1 sub-region 312 positioned within the Z1 perimeter 310 of Z1. In some embodiments of the disclosure, the thermal element 120 assigned to Z1 can also be configured to form patterns (e.g., an "X" pattern or a single diagonal "/" pattern) within Z1. In some embodiments of the disclosure, the vibration element 130 assigned to Z1 can also be configured to form patterns (e.g., an "X" pattern or a single diagonal "/" pattern) within Z1 that facilitate or optimize the power used to apply shearing stress to Z1. In some embodiments of the disclosure, an optimization engine can be used to determine the pattern or patterns of the vibrations elements 130.

Returning now to FIG. 2, the methodology 200 moves to decision block 206 to determine whether or not the IT reading for the initial/next zone accessed at block 206 is above a maximum value (Max). In aspects of the disclosure, the controller 150 is operable to receive a maximum IT that will be used to initiate activation of the thermal elements 120 and vibration elements 130 associated with the zone currently under evaluation. If the answer to the inquiry at decision block 206 is no, the methodology 200 moves to decision block 218 to determine whether the initial/next zone being evaluated is the last zone of the ice 170. If the answer to the inquiry at decision block 218 is no, the methodology 200 moves to decision block 220 to determine whether controller should cycle the methodology 200 through another evaluation of the zones of the ice 170. In some embodiments of the disclosure, additional cycles of the methodology 200 can be performed to maintain a de-iced state or to confirm that the prior iterations of the methodology 200 through the zones were all successful. If the answer to the inquiry at decision block 220 is yes, the methodology 200 moves to block 222 and ends. If the answer to the inquiry at decision block 218 or the inquiry at decision block 220 is no, the methodology 200 returns to block 204 to access and evaluate a next IT readings for a next zone.

Returning now to the decision block 206, if the answer to the inquiry at decision block 206 is yes, the methodology 200 moves to block 208 where the controller 150 coordinates with the power module 152 to activate the thermal element (TE) (e.g., thermal element 120) associated with the zone currently under evaluation by providing electrical power to the TE or thermal element 120. At block 208, the controller 150 can also use a set of the IT readings to determine an activation duration (used at decision block 210) of the thermal element 120 necessary to partially thaw the ice 170 to a predetermined level. At block 208, the controller 150 can also use a set of the IT readings, along with information of the level to which the ice 170 will be thawed by the thermal element 120, to compute an activation duration and vibration frequency of the vibration element

130. In embodiments of the disclosure where the vibration element includes a piezo-electric material, the controller 150 uses a set of the IT readings, along with information of the level to which the ice 170 will be thawed by the thermal element 120, to compute an activation duration (used at decision block 210) and a resonant frequency (based on the amplitude of signals from the sensor network 140) that will be applied by the power module 152 to a piezo-electric element used to implement the vibration element 130.

The methodology 200 moves to decision block 210 where the controller 150 determines whether or not a first termination criterion has been satisfied. In embodiments of the disclosure, the determination of whether or not the first termination criterion has been satisfied includes a determination whether or not the activation duration of the thermal element 120 has timed out. If the answer to inquiry at decision block 210 is no, the methodology 200 waits then returns to the input to decision block 210. If the answer to inquiry at decision block 210 is yes, the methodology 200 uses the controller 150 to deactivate the thermal element 120 (or the thermal element 120 includes sufficient electronic controls to time out and deactivate on its own), and then moves to block 212 to activate the vibration element 130. The methodology 200 moves to decision block 214 where the controller 150 determines whether or not a second termination criterion has been satisfied. In embodiments of the disclosure, the determination of whether or not the second termination criterion has been satisfied includes a determination whether or not the activation duration of the vibration element 130 has timed out. If the answer to inquiry at decision block 214 is no, the methodology 200 waits then returns to the input to decision block 214. If the answer to inquiry at decision block 214 is yes, the methodology 200 uses the methodology 200 moves to block 216 and deactivates the vibration element 130 (or the vibration element 130 includes sufficient electronic controls to time out and deactivate on its own). The operations depicted at blocks 208-216 are further illustrated by the plot 400 shown in FIG. 4. The plot 400 plots electric power over time applied to the thermal element 120 and the vibration element 130, along with the TE power curve 410 of the thermal element 120 and the VE power curve 420 of the vibration element 130. As shown in FIG. 4, at T1, IT is greater than Max (decision block 206), and the thermal element 120 is powered up for its activation duration (block 208). At T4, the activation duration of the thermal element 120 ends (decision block 210), the thermal element 120 is powered down (decision block 210), and the vibration element 130 is powered up (block 212). At T7, the activation duration of the vibration element 130 ends (decision block 214), and the thermal element 120 is powered down (block 216).

From block 216, the methodology 200 moves to decision block 218 to determine whether the initial/next zone being evaluated is the last zone of the ice 170. If the answer to the inquiry at decision block 218 is no, the methodology 200 moves to decision block 220 to determine whether controller should cycle the methodology 200 through another evaluation of the zones of the ice 170. In some embodiments of the disclosure, additional cycles of the methodology 200 can be performed to maintain a de-iced state or to confirm that the prior iterations of the methodology 200 through the zones were all successful. If the answer to the inquiry at decision block 220 is yes, the methodology 200 moves to block 222 and ends. If the answer to the inquiry at decision block 218 or the inquiry at decision block 220 is no, the methodology 200 returns to block 204 to access and evaluate a next IT readings for a next zone.

Figure 5:
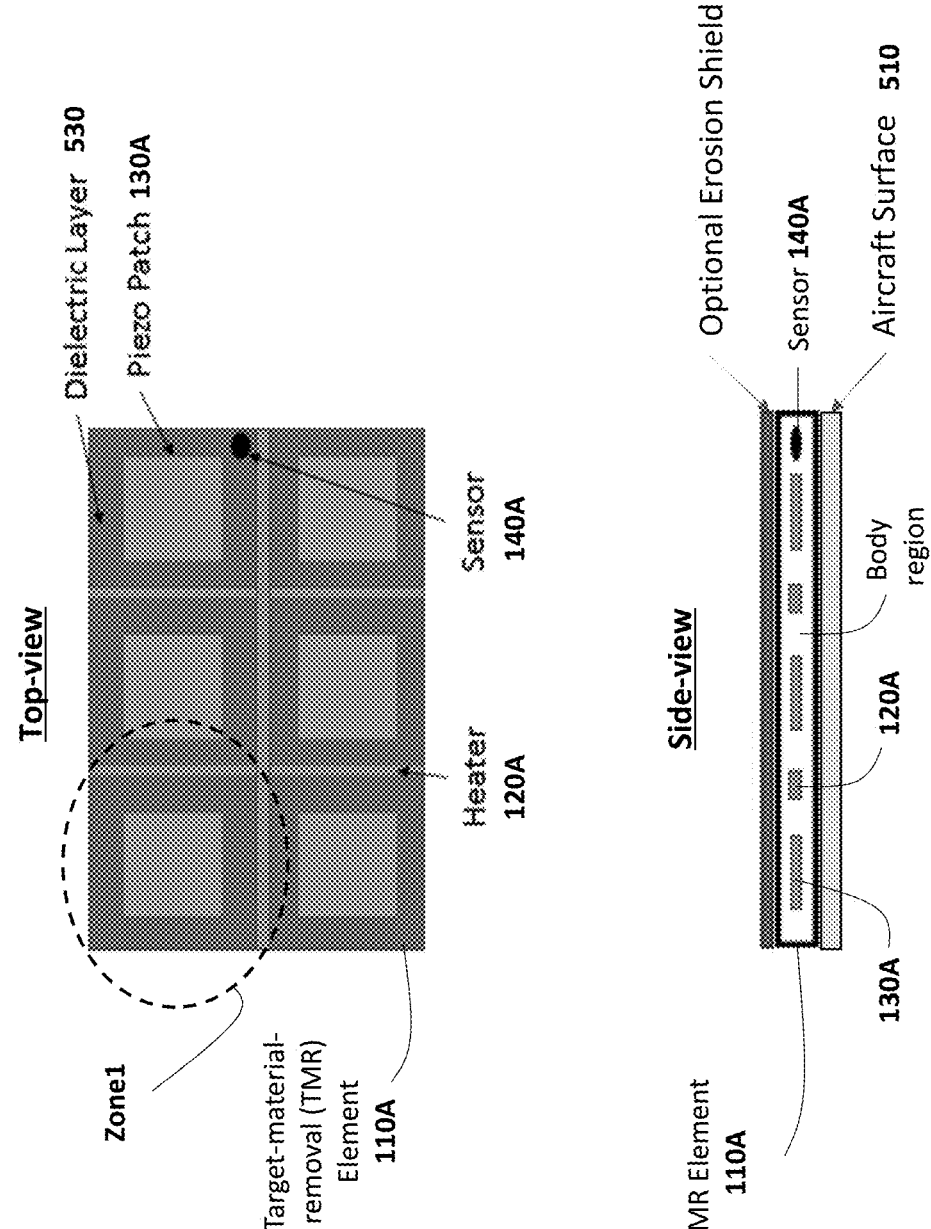
FIG. 5 is a simplified block diagram illustrating a top-view and a side-view of a non-limiting example of how a target-material-removal (TMR) element of the system shown in FIG. 1 can be implemented in accordance with embodiments of the disclosure.

FIG. 5 is a simplified block diagram illustrating a top-view and a side-view of a non-limiting example of how the TMR element 110 of the TMR system 100 shown in FIG. 1 can be implemented as a TMR element 110A in accordance with embodiments of the disclosure. As best shown in the side-view, the TMR element 110A can be attached using suitable attachment mechanism to any aircraft surface 510 that needs or will need de-icing, anti-icing, and/or other forms of ice protection. An optional erosion shield 520 can be provided on the TMR element 110A. As best shown in the top-view, the thermal element 120 is implemented as a plurality of heaters 120A, which can each be a metal line or wire operable to exhibit Joule heating in response to applied current. The vibration element 130 can be implemented as a plurality of piezo-electric patches 130A each having piezo-electric material operable to convert an electric signal at a resonant frequency to vibration energy. The sensor network 140 can include a plurality of sensors 140A, each of which can be implemented as a piezo-type sensor, an FBG (fiber Bragg grating) sensor, and/or an acceleration sensor. The body region 112 can be implemented as a plurality of body regions 112A (one example is depicted and is best shown in the side-view) that each include a dielectric layer 530 (best shown in the top-view) that provide electrical isolation for the heater elements 120A. The heater elements 120A segment define six (6) zones, one of which is labeled in the top-view of FIG. 5 as Zone1. It is understood that each zone includes one or more of the heaters 120A, the sensors 140A, and the piezo patches 130A.

Figure 6:
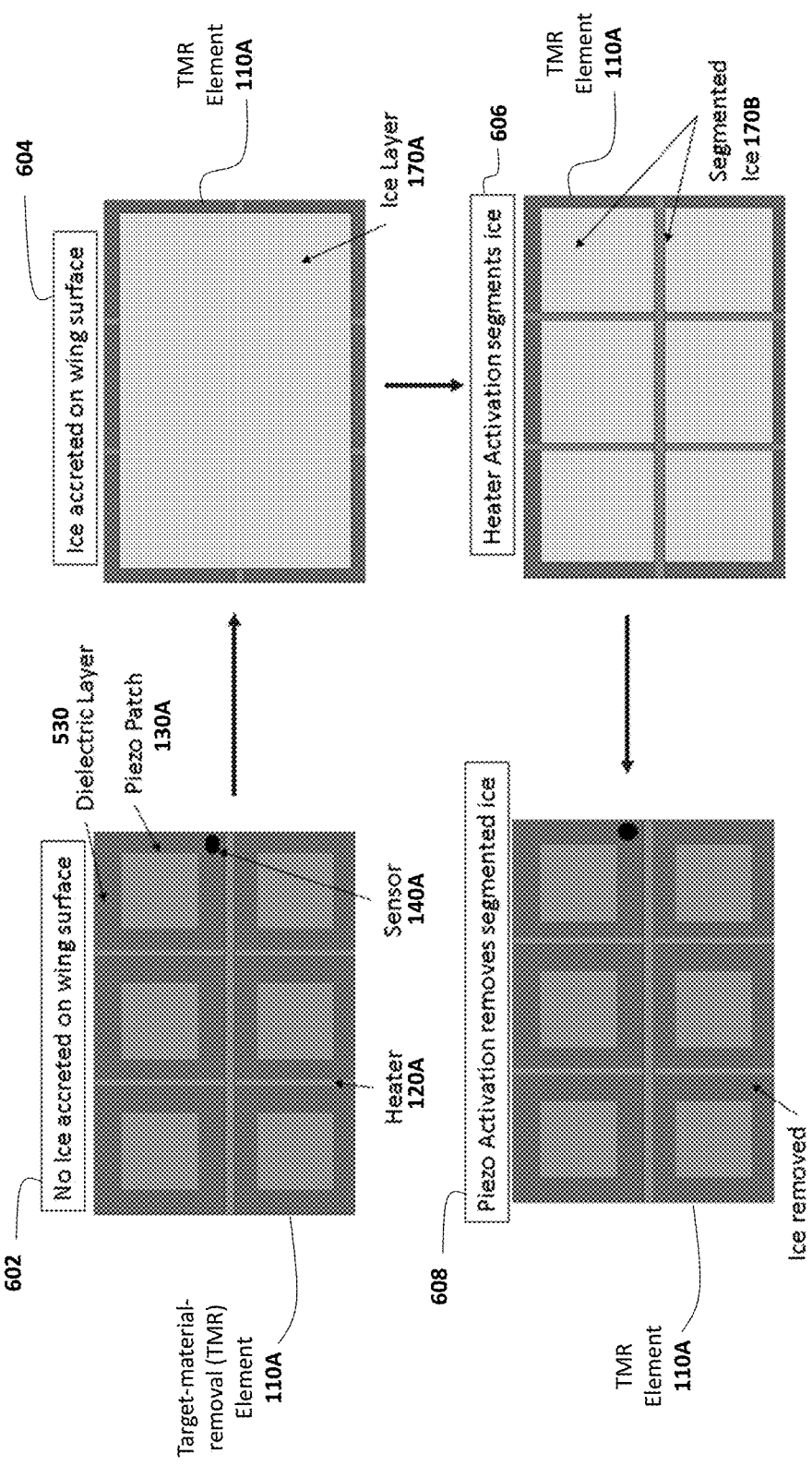
FIG. 6 is a simplified block diagram illustrating how the TMR element shown in FIG. 5 performs TMR operations in accordance with embodiments of the disclosure.

FIG. 6 is a simplified block diagram illustrating how the TMR element 110A shown in FIG. 5, along with the controller 150 and power module 152 shown in FIG. 1, perform TMR operations represented by operations 602-608 in accordance with embodiments of the disclosure. As shown in FIG. 6, at step 602, no ice 170A is accreted over the TMR element 110A and the aircraft surface. At step 604, ice 170A is accreted over the TMR element 110A and the aircraft surface. At step 606, the heater 120A is activated to segment the ice 170A into segmented ice 170B, which corresponds to the zones (e.g., Zone1 shown in FIG. 5). At step 608, the piezo patch 130A has been activated, and the vibrations from the piezo patch have imparted a sheering stress to the segmented ice 170B that loosens segmented ice 170B sufficiently that it falls off of the TMR element 110A.

Figures 7A, 7B:
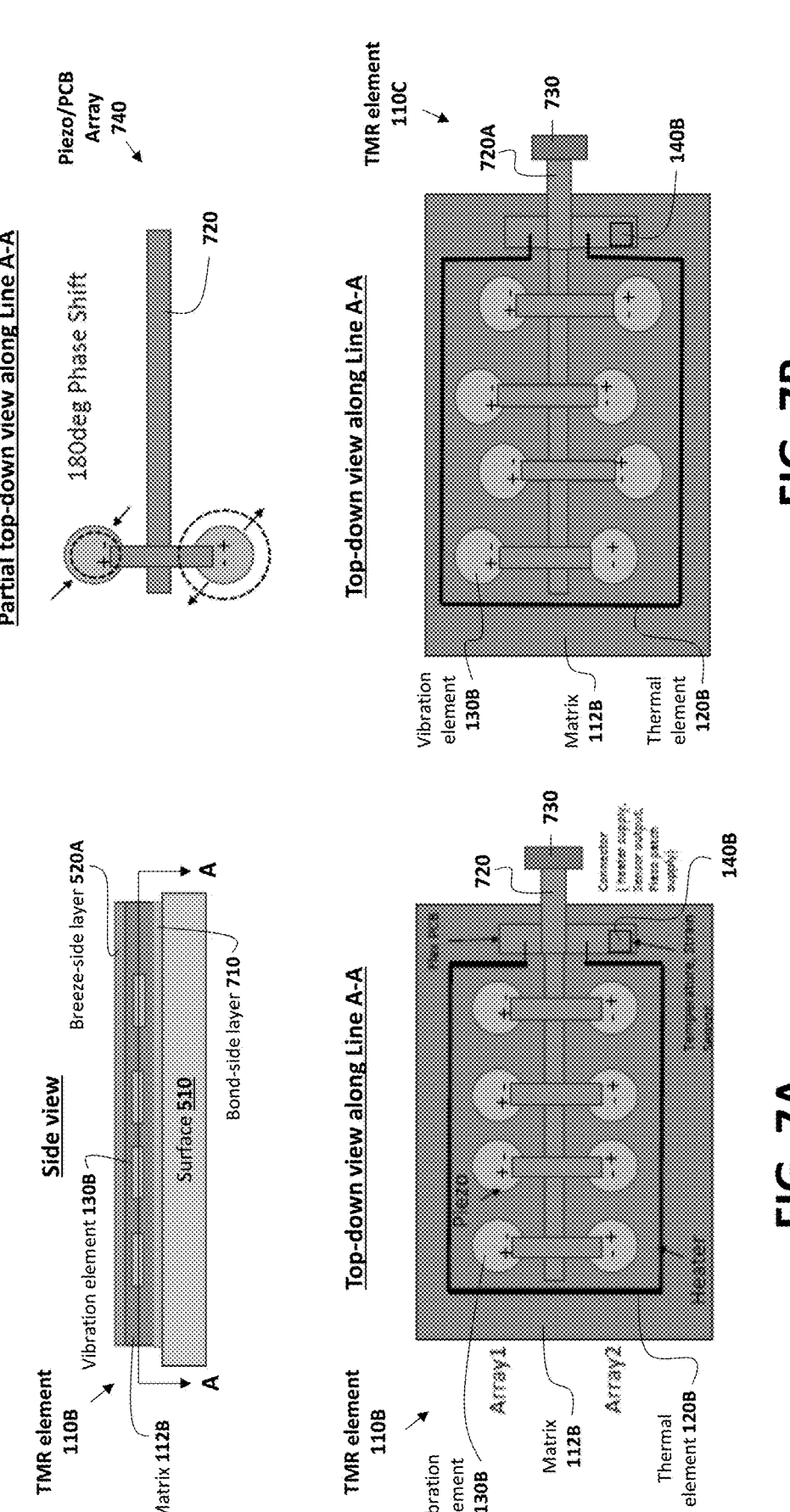
FIG. 7A is a simplified block diagram illustrating a top-down view and a side view of a non-limiting example of how a TMR element of the system shown in FIG. 1 can be implemented in accordance with embodiments of the disclosure.
FIG. 7B is a simplified block diagram illustrating a top-down view and a side view of a non-limiting example of how a TMR element of the system shown in FIG. 1 can be implemented in accordance with embodiments of the disclosure.

FIG. 7A is a simplified block diagram illustrating a side-view and a top-down view (taken along line A-A of the side view) of a non-limiting example of how the TMR element 110 of the TMR system 100 shown in FIG. 1 can be implemented as a TMR element 110B in accordance with embodiments of the disclosure. As best shown in the side-view, the TMR element 110B includes a matrix region 112B sandwiched between a breeze-side layer 520A and a bond-side layer 710. The matrix region 112B is operable to house a network of zoned vibration (or piezo-electric) elements 130B integrated with a flexible printed circuit board (PCB) 720 to form a piezo/PCB array 740 (shown in FIG. 7B) or network of zoned vibration elements 130B. The matrix region 112B can also house a network of sensors 140B (e.g., temperature, strain, etc.). In some embodiments of the disclosure, the matrix region 112B further includes zoned thermal elements 120B are integrated with the zoned vibration elements 130B according to an offset pattern (shown in FIG. 7B) operable to produce optimum shear stress at an interface with the target material 170 (or the ice 170A) to effectively and efficiently shed accreted target material 170. The bond-side layer 710 is operable to assist with mounting the integrated TMR element 110B to the structure 510 with application of, for example, a suitable adhesive.

As best shown in FIG. 7B, the matrix region 112B can further include an array of the vibration element 130B electrically connected in an offset fashion to a flexible control board or PCB 720A, where the zoned thermal elements 120B are laced across locations surrounding the TMR vibration element elements 130B strategically to assist with fragmentation, shearing and shedding of the target material 170. The breeze-side layer 520A is operable to shield the underlaying layers of the integrated TMR element 110B from erosion and environmental impact. the TMR element 110B can be attached using suitable attachment mechanism to any surface 510 (e.g., an aircraft) that needs or will need de-icing, anti-icing, and/or other forms of ice protection. An optional breeze-side layer shield 520A can be provided on the TMR element 110B. As best shown in the top-down views of FIGS. 7A and 7B, the thermal element 120B is implemented as a plurality of heaters, which can each be a metal line or wire operable to exhibit Joule heating in response to applied current. The vibration element 130A can be implemented as a plurality of piezo-electric patches each having piezo-electric material operable to convert an electric signal (e.g., supplied through connector 730) at a resonant frequency to vibration energy. The sensor network 140B can include a plurality of sensors, each of which can be implemented as a piezo-type sensor, an FBG (fiber Bragg grating) sensor, and/or an acceleration sensor. The matrix region 112B can be implemented as a plurality of matrix regions 112B that each include a dielectric material that provides electrical isolation for the heater elements 120B. The heater elements 120B segment define six (6) zones, one of which is labeled in the top-view of FIG. 5 as Zone1. It is understood that each zone includes one or more of the heaters 120B, the sensors 140B, and the piezo patches 130B.

FIG. 7B illustrates further details of the piezo/PCB array 740. FIG. 7B illustrates the use of a 180 degree phase shift, which means that one row of piezo is actuated with Current A while an opposite piezo will be operated with inverted current (−A). This 180 degree phase shift method helps to actuate the arrays at expanding and compressing modes.

Figure 8:
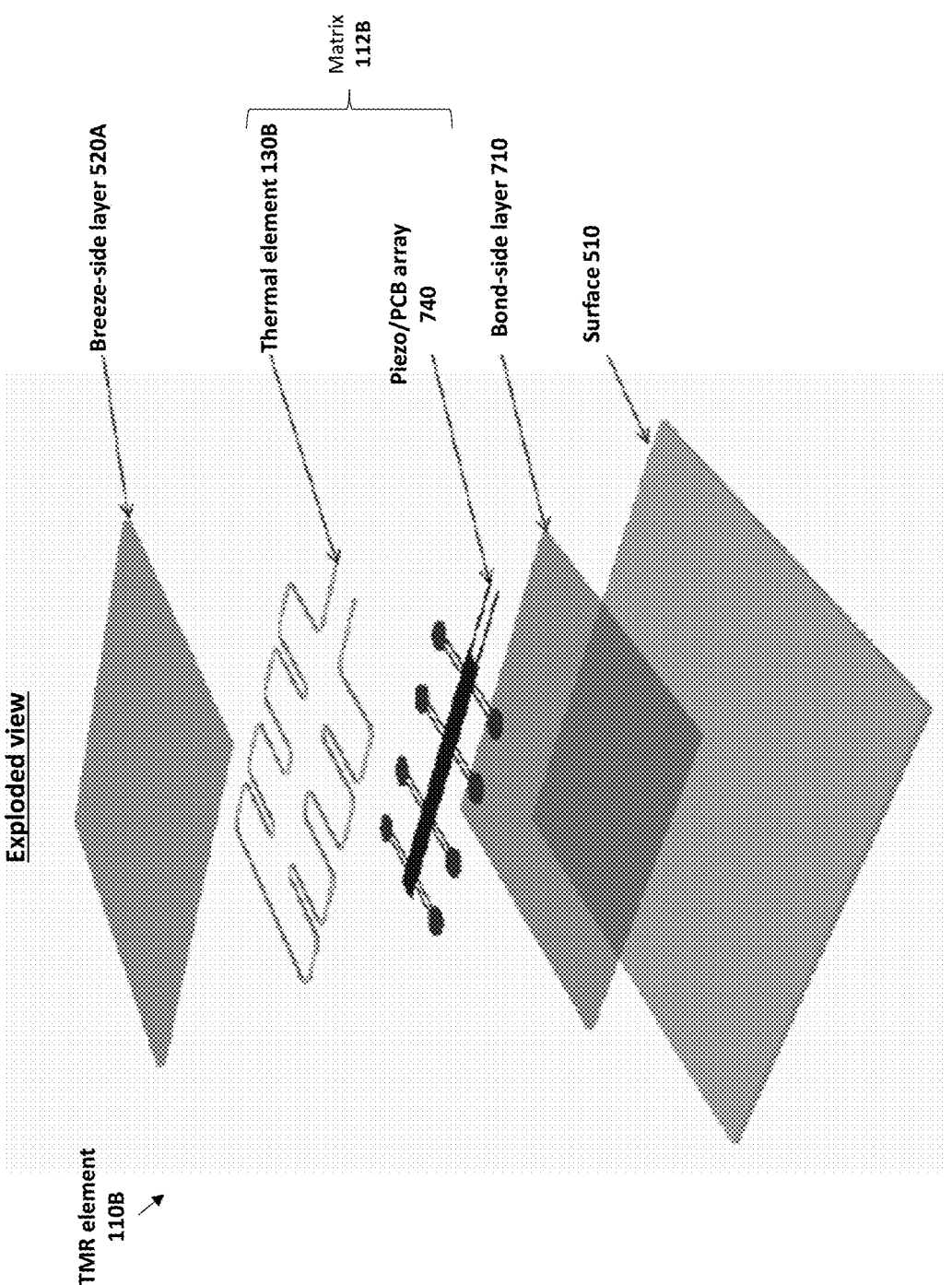
FIG. 8 is a simplified block diagram illustrating an exploded view of a non-limiting example of how a TMR element of the system shown in FIG. 1 can be implemented in accordance with embodiments of the disclosure.

FIG. 8 depicts an exploded view of the TMR element 110B, along with the surface 510, the bond-side layer 710, and the breeze-side layer 520A. As shown, the matrix 112B includes the thermal element 130B and the piezo/PCB array 740, configured and arranged as shown. The matrix 112B is positioned between the breeze-side layer 520A and the bond-side layer 710. In embodiments of the disclosure, the matric region 112B can be formed by molding or thermal forming the different layers show in FIG. 8. The matrix region extends to equal distances of top and bottom of the piezo vibration elements 130B and the PCB 720. The piezo vibration elements 130B are centered at the center of each Zone (e.g., Zone1 shown in FIG. 5) regardless of the size of the piezo vibration elements 130B. In some embodiments of the disclosure, the TMR element 110B can be built separately before being bonded to the surface 510. The flexible PCB makes electrical connection through the connector 730 to the controller 150 (shown in FIG. 1) and/or the power module 152 (shown in FIG. 1).

Figure 9:
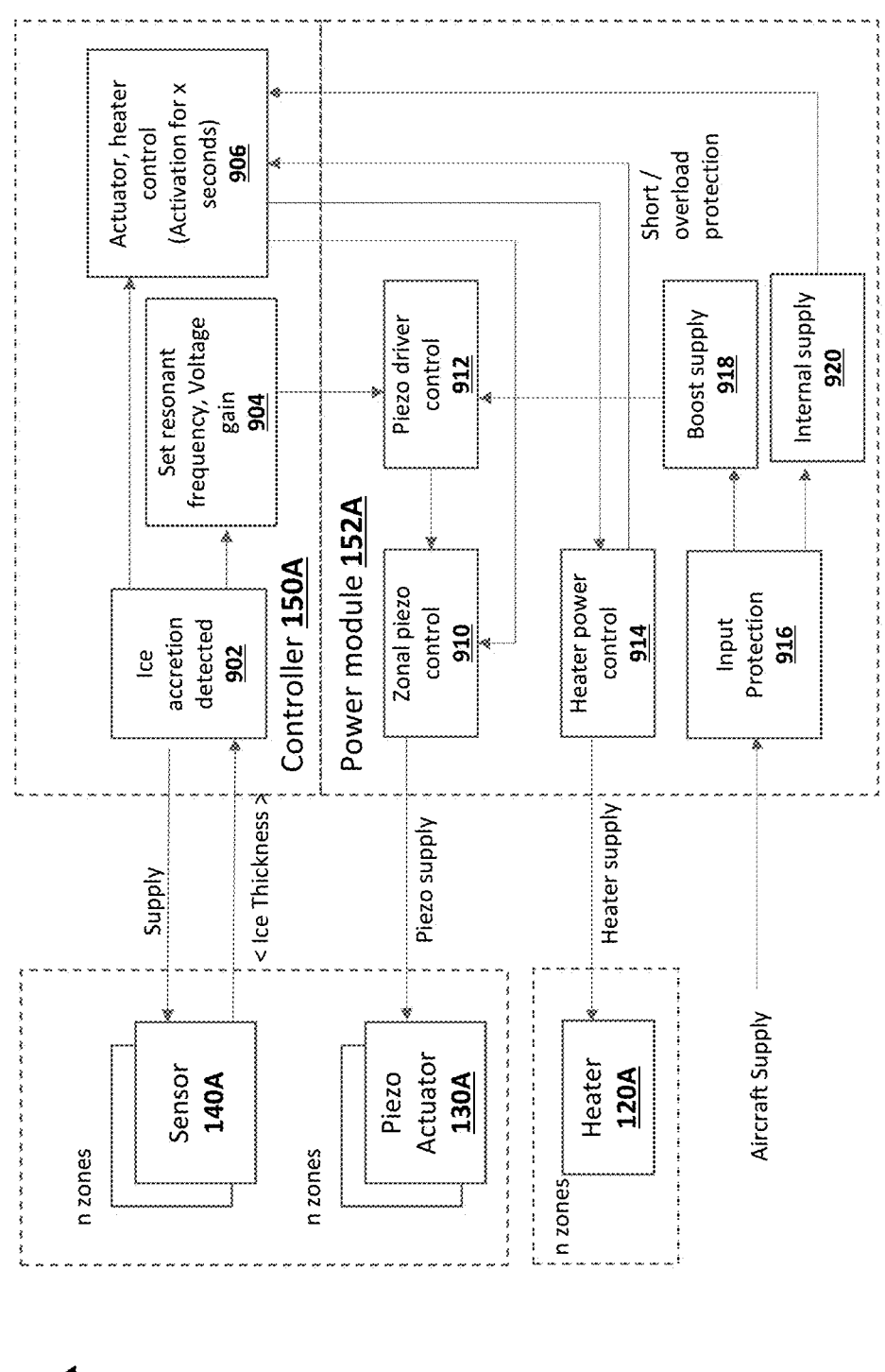
FIG. 9 is a simplified block diagram illustrating a non-limiting example of how the system shown in FIG. 1 can be implemented in accordance with embodiments of the disclosure.

FIG. 9 is a simplified block diagram illustrating a non-limiting example of how the TMR system 100 shown in FIG. 1 can be implemented as a TMR system 100A in accordance with embodiments of the disclosure. More specifically, the TMR system 100A provides additional details of how the controller 150 and the power module 152 can be implemented as a controller 150A and a power module 152A. The controller 150A can be implemented to include an ice accretion detection module 902, a set resonant frequency and voltage gain module 904, and an actuator, heater control module 906, configured and arranged as shown. The modules 902, 904, 906 receive signals, including IT (ice thickness) readings, from the sensors 140A and use the same to generate signals that are provided to and through the power module 152A to the piezo actuators 130A and the heater elements 120A. The power module 152A is operable to receive power inputs from a host structure, which in this example is an aircraft supply. In some embodiments of the disclosure, the aircraft supply is a battery, a generator, and the like. The power module 152A includes a zonal piezo control module 910, a piezo driver control module 912, a heater power control module 914, an input protection module 916, a boost supply module 918, and an internal supply 920, configured and arranged as shown. The modules 904, 906, 910, 912, 914, 916, 918, and 920 cooperate using known signal process and power generation techniques to perform the TMR operations described herein (e.g., the methodology 200 shown in FIG. 2) to generate and provide piezo supply signals to the piezo actuator 130A and heater supply signals to the heater elements 120A.

In embodiments of the disclosure, the sensors 140A continuously detect ice formation on an associated surface and send data to the controller 150A. In some embodiments of the disclosure, based on the signal amplitude of the sensor reading from the sensors 140A, the controller 150A computes the resonant frequency of each zone (e.g., Zone1 shown in FIG. 5. The controller 150A monitors all zonal sensors data and activates the zones in sequence from Zone1 to Zone-n. The controller 150A powers up heater 120A for "th" seconds to segment the ice enabling easier shedding action for the piezo patch 130A. The controller 150A commands zonal control of the piezo patches 130A for enabling the respective zone actuator for duration "tp" seconds at resonant frequency. The controller 150A dynamically configures and adjusts the resonant frequency for the piezo patches 130A (or piezo actuators). Once the ice detection drops to a low threshold limit, the zone is switched off and TMR action would continue on the zones where ice detection has not dropped to the low threshold limit.

In some embodiments of the disclosure, the generation of the appropriate control signals (e.g., as shown in FIG. 4) that are responsive to the outputs of the sensors 140A can be configured as machine learning tasks, and the controller 150A can be configured to include machine learning algorithms configured and arranged to perform the heat-induced thawing control operations and vibration-induced dislodging control operations described herein as machine learning tasks. In general, machine learning techniques are run on so-called "neural networks," which can be implemented as programmable computers configured to run sets of machine learning algorithms and/or natural language processing algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., from the sensor 140A) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include identifying objects in images (e.g., stop signs, pedestrians, lane markers, etc.), recognizing gestures in video, detecting voices, detecting voices in audio, identifying particular speakers, transcribing speech into text, and the like. Clustering tasks identify similarities between objects, which the clustering task groups according to those characteristics in common and which differentiate them from other groups of objects. These groups are known as "clusters."

Figure 10:
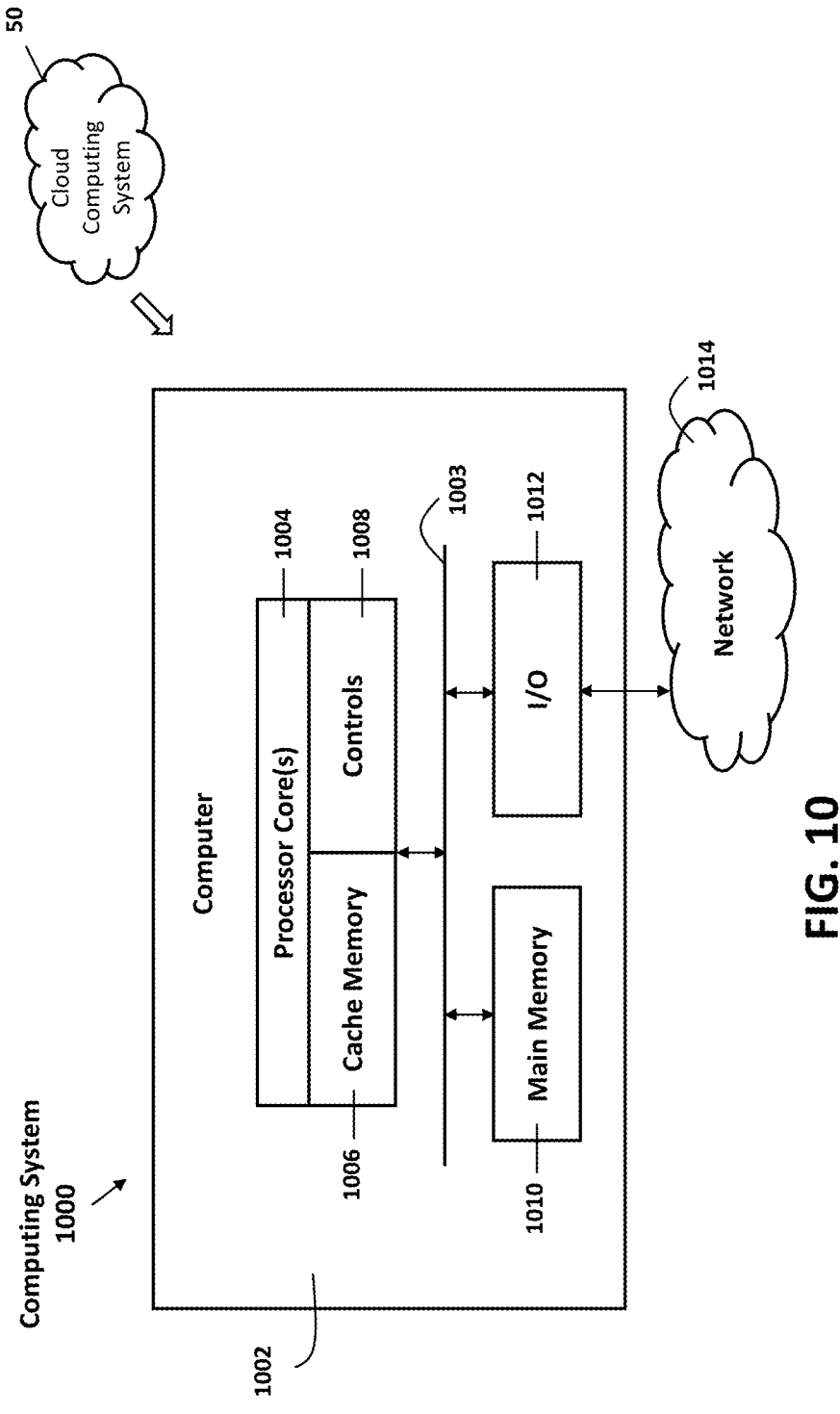
FIG. 10 is a simplified block diagram illustrating a computing system operable to implement embodiments of the disclosure.

FIG. 10 illustrates an example of a computer system 1000 that can be used to implement the computer-based components in accordance with aspects of the disclosure. The computer system 1000 includes an exemplary computing device ("computer") 1002 configured for performing various aspects of the content-based semantic monitoring operations described herein in accordance aspects of the disclosure. In addition to computer 1002, exemplary computer system 1000 includes network 1014, which connects computer 1002 to additional systems (not depicted) and can include one or more wide area networks (WANs) and/or local area networks (LANs) such as the Internet, intranet(s), and/or wireless communication network(s). Computer 1002 and additional system are in communication via network 1014, e.g., to communicate data between them.

Exemplary computer 1002 includes processor cores 1004, main memory ("memory") 1010, and input/output component(s) 1012, which are in communication via bus 1003. Processor cores 1004 includes cache memory ("cache") 1006 and controls 1008, which include branch prediction structures and associated search, hit, detect and update logic, which will be described in more detail below. Cache 1006 can include multiple cache levels (not depicted) that are on or off-chip from processor 1004. Memory 1010 can include various data stored therein, e.g., instructions, software, routines, etc., which, e.g., can be transferred to/from cache 1006 by controls 1008 for execution by processor 1004. Input/output component(s) 1012 can include one or more components that facilitate local and/or remote input/output operations to/from computer 1002, such as a display, keyboard, modem, network adapter, etc. (not depicted).

A cloud computing system 50 is in wired or wireless electronic communication with the computer system 1000. The cloud computing system 50 can supplement, support or replace some or all of the functionality (in any combination) of the computing system 1000. Additionally, some or all of the functionality of the computer system 1000 can be implemented as a node of the cloud computing system 50.

Many of the functional units of the systems described in this specification have been labeled as modules. Embodiments of the disclosure apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

The various components/modules/models of the systems illustrated herein are depicted separately for ease of illustration and explanation. In embodiments of the disclosure, the functions performed by the various components/modules/models can be distributed differently than shown without departing from the scope of the various embodiments of the disclosure describe herein unless it is specifically stated otherwise.

Aspects of the disclosure can be embodied as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The terms "about," "substantially," and equivalents thereof are intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A target material removal (TMR) element comprising:
a body region comprising body region zones having zone-center regions and zone-perimeter regions that are around and do not overlap with the zone-center regions;
thermal elements within the body region and the zone-perimeter regions; and
vibration elements within the body region and the zone-center regions;
wherein the TMR element is controlled to perform TMR operations comprising:
   one or more of the thermal elements generating heat that is transmitted into and through one or more of the zone-perimeter regions of the body region to a target material; and
   subsequent to the one or more of the thermal elements beginning generating the heat that is transmitted into and through one or more of the zone-perimeter regions of the body region to the target material, the one or more of the vibration elements generating dislodgement-inducing vibrations that are transmitted into and through one or more of the zone-center regions of the body region to the target material; and
wherein the dislodgement-inducing vibrations are configured to induce dislodgement of one or more portions of the target material.

2. The TMR element of claim 1, wherein the vibration elements comprise piezo-electric material that generates the dislodgement-inducing vibrations at a frequency configured to enable the dislodgement-inducing vibrations to induce dislodgement of the one or more portions of the target material.

3. The TMR element of claim 1, wherein:
the thermal elements comprise a first thermal element;
the vibration elements comprise a first vibration element;
the one or more body region zones comprise a first body region zone having a first zone-perimeter region and a first zone-center region;

the first thermal element transmits at least a first portion of the heat through the first zone-perimeter region; and the first vibration element transmits at least a first portion of the dislodgment-inducing vibrations through the first zone-center region.

4. The TMR element of claim 3, wherein:

the thermal elements comprise a second thermal element;

the vibration elements comprise a second vibration element;

the one or more body region zones comprise a second body region zone having a second zone-perimeter region and a second zone-center region;

the second thermal element transmits a second portion of the heat through the second zone-perimeter region; and the second vibration element transmits a second portion of the dislodgement-inducing vibrations through the second zone-center region.

5. The TMR element of claim 3, wherein:

the target material comprises a target frozen material; and the at least first portion of the heat is applied to the frozen material in a target material first zone-perimeter region corresponding to the first zone-perimeter region.

6. The TMR element of claim 5, wherein the at least first portion of the dislodgement-inducing vibrations is sufficient to impart shearing stress to a target material first zone-center region corresponding to the first zone-center region.

7. The TMR element of claim 4, wherein:

the target material comprises a target frozen material;

the at least first portion of the heat is applied to the target frozen material in a target material first zone-perimeter region corresponding to the first zone-perimeter region;

the at least first portion of the dislodgement-inducing vibrations is sufficient to impart shearing stress to a target material first zone-center region corresponding to the first zone-center region;

the second portion of the heat is applied to the target frozen material in a target material second zone-perimeter region corresponding to the second zone-perimeter region;

the second portion of the dislodgement-inducing vibrations is sufficient to impart shearing stress to a target material second zone-center region corresponding to the second zone-center region; and the dislodgement of the one or more portions of target material is further based at least in part on the shearing stress imported to a first portion of the target material and a second portion of the target material.

8. An ice protection system (IPS) comprising:

a body region comprising body region zones having zone-center regions and zone-perimeter regions that are around and do not overlap with the zone-center regions;

thermal elements within the body region and the zone-perimeter regions;

vibration elements within the body region and the zone-center regions; and a sensor network within the body region;

wherein the IPS is controlled to perform ice protection operations comprising:

the sensor network detecting a formation of a target frozen material to a predetermined first thickness;

based at least in part on the sensor network detecting the formation of the target frozen material to the predetermined first thickness, one or more of the thermal elements generating heat that is transmitted into and through one or more of the zone-perimeter regions of the body region to the target frozen material; and subsequent to the one or more of the thermal elements beginning generating the heat that is transmitted into and through one or more of the zone-perimeter regions of the body region to the target frozen material, one or more of the vibration elements generating dislodgement-inducing vibrations that are transmitted into and through one or mor of the zone-center regions of the body region to the target frozen material; and wherein the dislodgment-inducing vibrations are configured to induce dislodgement of one or more portions of the target material.

9. The IPS of claim 8, wherein the vibration elements comprise piezo-electric material that generates the dislodgement-inducing vibrations at a frequency configured to enable the dislodgement-inducing vibrations to induce dislodgement of the one or more portions of the target material.

10. The IPS of claim 8, wherein:

the thermal elements comprise a first thermal element;

the one or more body region zones comprise a first body region zone having a first zone-perimeter region and a first zone-center region; and the first thermal element transmits at least a first portion of the heat through the first zone-perimeter region.

11. The IPS of claim 10, wherein:

the vibration elements comprise a first vibration element;

the first vibration element transmits at least a first portion of the dislodgement-inducing vibrations through the first zone-center region; and the ice protection operations further comprise terminating operation of the first vibration element responsive to a determination that a first termination criterion has been satisfied.

12. The IPS of claim 11, wherein the determination that the first termination criterion has been satisfied comprises a determination that an activation duration of the first vibration element has ended.

13. The IPS of claim 11, wherein:

the thermal elements comprise a second thermal element;

the one or more body region zones comprise a second body region zone having a second zone-perimeter region and a second zone-center region;

the second thermal element transmits a second portion of the heat through the second zone-perimeter region;

the vibration elements comprise a second vibration element;

the second vibration element transmits a second portion of the dislodgement-inducing vibrations through the second zone-center region;

the ice protection operations further comprise terminating operation of the second vibration element responsive to a determination that a second termination criterion has been satisfied; and the determination that the second termination criterion has been satisfied comprises a determination that an activation duration of the second vibration element has ended.

14. The IPS of claim 13, wherein:

the at least first portion of the dislodgement-inducing vibrations is sufficient to impart shearing stress to a target material first zone-center region corresponding to the first zone-center region;

the second portion of the dislodgement-inducing vibrations is sufficient to impart shearing stress to a target material second zone-center region corresponding to the second zone-center region; and the dislodgement of the one or more portions of target material is further based at least in part on the shearing stress imported to a first portion of the target material and a second portion of the target material.

15. A controller configured to perform controller operations that control a target material removal (TMR) element, the controller operations comprising:

sending control instruction to the TMR element that control the TMR to perform TMR operations;

wherein the TMR element comprises a body region that includes thermal elements and vibration elements;

wherein the body region comprises body region zones having zone-center regions and zone-perimeter regions that are around and do not overlap with the zone-center regions;

wherein thermal elements are within the zone-perimeter regions;

wherein the vibration elements are withing the zone-center regions;

wherein the TMR operations comprise:

one or more of the thermal elements generating heat that is transmitted into and through one or more of the zone-perimeter regions of the body region to a target material; and subsequent to the one or more of the thermal elements beginning generating the heat that is transmitted into and through one or more of the zone-perimeter regions of the body region to the target material, the one or more of the vibration elements generating dislodgement-inducing vibrations that are transmitted into and through one or more of the zone-center regions of the body region to the target material; and wherein the dislodgement-inducing vibrations are configured to induce dislodgement of one or more portions of the target material.

16. The controller of claim 15, wherein the vibration elements comprise piezo-electric material that generates the dislodgement-inducing vibrations at a frequency configured to enable the dislodgement-inducing vibrations to induce dislodgement of the one or more portions of the target material.

17. The controller of claim 15, wherein:

the thermal elements comprise a first thermal element;

the one or more body region zones comprise a first body region zone having a first zone-perimeter region and a first zone-center region;

the TMR operations further comprise the first thermal element transmits at least a first portion of the heat through the first zone-perimeter region;

the vibration elements comprise a first vibration element; and the TMR operations further comprise the first vibration element transmits at least a first portion of the dislodgment-inducing vibrations through the first zone-center region.

18. The controller of claim 17, wherein:

the thermal elements comprise a second thermal element;

the vibration element comprises a second vibration element;

the one or more body region zones comprise a second body region zone having a second zone-perimeter region and a second zone center region;

the TMR operations further comprise the second thermal element transmits a second portion of the heat through the second zone-perimeter region; and the TMR operations further comprise the second vibration element transmits a second portion of the dislodgement-inducing vibrations through the second zone-center region.

19. The controller of claim 17, wherein:

the target material comprises a target frozen material;

the TMR operations further comprise the at least first portion of the heat is applied through the first zone-perimeter region to a corresponding target frozen material first zone-perimeter region; and the TMR operations further comprise the at least some of the first portion of the dislodgement-inducing vibrations is sufficient to impart shearing stress to the target frozen material.

20. The controller of claim 18, wherein:

the target material comprises a target frozen material;

the TMR operations further comprise the at least first portion of the heat is applied through the first zone-perimeter region to a corresponding target frozen material first zone-perimeter region;

the TMR operations further comprise the at least first portion of the dislodgement-inducing vibrations is sufficient to impart shearing stress to the target frozen material;

the TMR operations further comprise the second portion of the heat is applied through the second zone-perimeter region to a corresponding target frozen material second zone-perimeter region; and the TMR operations further comprise the second portion of the dislodgement-inducing vibrations is sufficient to impart shearing stress to the target frozen material.

* * * * *